Patented Dec. 23, 1930

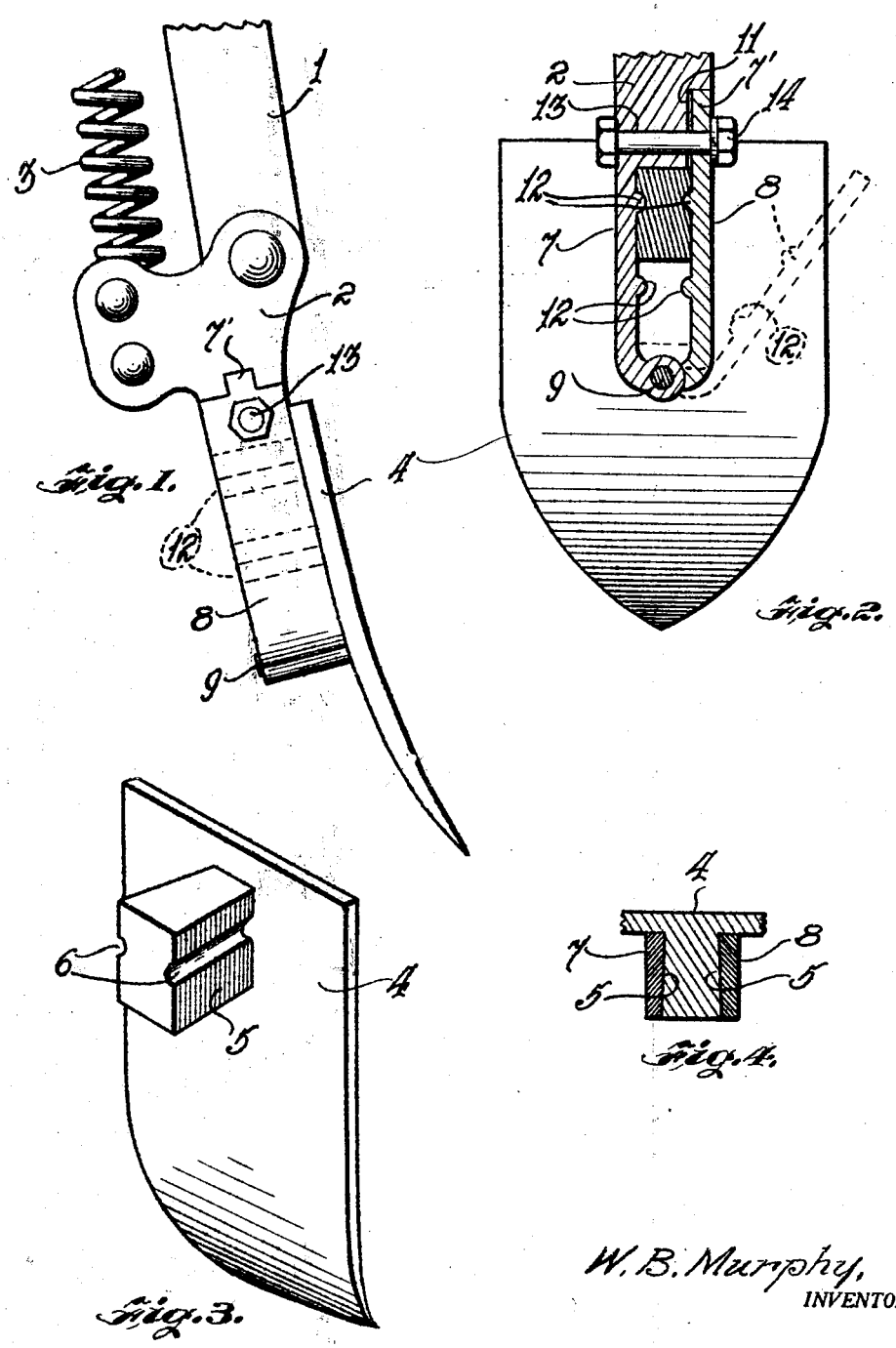

1,786,124

UNITED STATES PATENT OFFICE

WILLIAM B. MURPHY, OF CRANDALL, TEXAS

DETACHABLE CULTIVATOR SWEEP

Application filed December 26, 1929. Serial No. 416,525.

This invention relates to improvements in agricultural implements and in such connection it relates more particularly to a new and improved means for detachably connecting a soil cultivating implement to the foot piece or standard which carries the sweeps or shovels.

Another particular object of the invention lies in the novel means for effecting adjustment of the cultivator sweep or shovel, whichever carries the attaching means, to the foot, or element to which attached.

The invention is illustrated in the accompanying drawings, forming part of this specification, and in the drawings:

Figure 1 represents a side elevational view of the attaching means as applied to a cultivator shovel and showing a portion of the foot to which the shovel is connected.

Figure 2 represents a rear view of the shovel, showing in detail the mode of detachably connecting the latter to the foot, the parts embodying the invention being in section.

Figure 3 represents a perspective view of the shovel removed from the foot, and illustrating more clearly the element formed on the shovel (or sweep) for effecting its connection with the foot; and Figure 4 is a detail sectional view taken vertically through the rear of the shovel connecting element and parts co-acting therewith.

Having a more detailed reference to the drawings, 1 denotes a cultivator foot of conventional form and which includes a pivotal element 2, co-operating with a spring 3, the spring being for the purpose of resiliency in enabling the shovel or sweep to have a certain amount of play in its engagement with the soil.

The invention consists of the shovel 4 and in this connection it is to be understood that the means for detachably connecting a soil treating or cultivating implement as herein shown is applicable to either a shovel or a sweep. On the back of the shovel 4 there is formed integrally a lug having a tapering surface on both sides as at 5. This lug is disposed centrally on the upper portion of the shovel or sweep and is grooved on the two sides 5 as indicated at 6.

The pivotal element 2, as is clearly shown in Figure 2, and which forms a part of this invention, is directed downward on one side at 7, and has its opposite side formed into a swingable portion 8. The lower end of the portion 8 is hingedly connected to the side 7 by the pin 9, and the lower end of the part 2 has a recess as indicated at 11 formed therein for seating the upper end or tongue 7' of the portion 8 which is adapted to be swung inwardly and outwardly, as shown by the full line and broken line positions in Figure 2.

Formed on the interior faces of the portion 7 and the movable or swingable portion 8 are lugs 12 and in the operation of the device in effecting the adjustment and holding the shovel or sweep in place, these lugs are seated snugly in the grooves 6 on opposite sides of the large lug carried on the implement, a shovel or sweep, which is connected to the shank 1.

The upper portions of the element 2 and the swingable element 8 are apertured for the passage of a bolt 13 for holding the parts together. The inner surfaces of the elements or portions 7 and 8 are so cast as to lie snugly against the tapered sides of the large lug, and the small lugs 12 are likewise made to lie in close contact with the grooves 6.

Attention is also directed to the tongue 7' on the portion 8 and the recess 11 into which the tongue seats. It will be apparent that when the sweep or shovel is thrust forward after having at any time been moved against the tension of the spring 3, the strain will be on the bolt 13, which bolt holds the swingable portion 8 in intimate contact with the large lug. To reduce this strain or to prevent it from being altogether on the bolt, the tongue 7' is seated in the recess 11 and will thus materially reduce the shock or strain when the shovel or sweep retains its normal position.

From the foregoing it will now be apparent that the device is capable of holding a shovel or sweep in position on the foot and that side and vertical dislocation of the implement on which it is placed will be prevented. When removing the sweep or shovel, it is only necessary to take off the nut 14 and slide the bolt 13 slightly outward to enable the movable part 8 to be swung into the broken line position, and the implement can then be easily removed or adjusted to a higher or lower level as desired.

The invention, however, is capable of some modification, such as would be within the scope and meaning of the appended claims.

What is claimed as new is:

1. Means for detachably connecting a cultivator sweep to the standard of a cultivator, said means comprising a lug formed on the rear side of the sweep, said lug having a tapered form and provided with lateral grooves; an element pivoted to said cultivator standard and having spaced and depending parts with lugs; said lug of the sweep adapted to be received in between said depending parts in locking and attaching the sweep onto the standard.

2. A detachable soil treating implement for connection to the standard of a cultivator, said implement including a lug on its rear side and provided with grooves; an element having parts with lugs on the inside of the parts for engagement with the grooves in said lug on the implement, one of said parts being pivoted to swing from the other and means for connecting the swingable part to the other in replacing and removing the implement.

3. A detachable soil treating implement for connection to the standard of a cultivator, said implement including a lug on the rear side of its shank, said lug being tapered and provided with grooves; an element having downwardly-directed parts spaced from one another and grooves formed in spaced relation on the inner sides thereof; one of said parts being swingably-engaged with the other, whereby said lug on the implement and said lugs on the downwardly-directed parts are interlocked to connect the implement with the standard.

4. A detachable soil treating implement as claimed in claim 3 and wherein said downwardly-directed parts are pivoted to said standard, and wherein the said parts include a tongue and groove connection one with the other and including a bolt for fastening the parts together.

In testimony whereof I affix my signature.

WILLIAM B. MURPHY.